United States Patent [19]
Bernett et al.

[11] Patent Number: 5,471,733
[45] Date of Patent: Dec. 5, 1995

[54] PROCESS OF ASSEMBLING A DISK DRIVE WITH MINIMUM SPACING BETWEEN DISKS

[75] Inventors: Frank W. Bernett; Michael A. Brown, both of Colorado Springs, Colo.

[73] Assignee: Quantum Corporation, Milpitas, Calif.

[21] Appl. No.: 212,371

[22] Filed: Mar. 11, 1994

Related U.S. Application Data

[62] Division of Ser. No. 906,276, Jun. 26, 1992, abandoned.

[51] Int. Cl.⁶ .................................................. G11B 5/127
[52] U.S. Cl. .................................................. 29/603; 29/469
[58] Field of Search ........................... 29/603, 469, 464; 360/98.01, 104–106

[56] References Cited

U.S. PATENT DOCUMENTS

5,074,029  12/1991  Brooks, Jr. et al. ..................... 29/603
5,150,512  9/1992  Hatchett et al. ......................... 29/603

*Primary Examiner*—S. Thomas Hughes
*Attorney, Agent, or Firm*—David B. Harrison

[57] ABSTRACT

A disk drive data storage device in which the space between adjacent disks is minimized. The disk drive comprises an actuator, a plurality of arm assemblies and at least two disks mounted on a spindle for rotation at a desired speed. Each arm assembly comprises an arm member, one end of which is integrally connected to the actuator and a head flexure assembly connected to the other end of said arm member. A pair of arm assemblies are positioned between each pair of disks with the arm assemblies lying in substantially the same horizontal plane but one arm assembly having a landing zone at the outside diameter of one of the disks and the other arm assembly having a landing zone at the inside diameter of the other one of the disks. The disk drive is assembled using a split baseplate with the actuator mounted on one portion of the baseplate and the spindle/disk assembly mounted on the other portion of the baseplate.

3 Claims, 4 Drawing Sheets

PROCESS OF ASSEMBLING A DISK DRIVE WITH MINIMUM SPACING BETWEEN DISKS

This application is a division of application Ser. No. 07/906,276, filed Jun. 26, 1992, now abandoned.

FIELD OF THE INVENTION

The present invention relates to a disk drive and, in particular, a rotary actuator structure of a disk drive which reduces the space between disks to a minimum and a method of manufacturing the disk drive.

BACKGROUND OF THE INVENTION

Known disk drives for data storage systems comprise at least two disks mounted upon a spindle which is driven by a motor and an actuator assembly having a plurality of arm assemblies. Each arm assembly comprises at least an arm member one end of which is integral with the actuator body forming a portion of what is commonly referred to as an E block and a single or double head flexure assembly. A single head flexure assembly comprising a load beam connected to the arm member with a mounting plate, a gimbal connected to the load beam and a read/write head assembly connected to the gimbal. A double head flexure assembly comprises two load beams, one connected to the top of the arm member with a mounting plate and the other connected to the bottom of the arm member with a mounting plate, two gimbals, each respectively connected to one of the load beams, and two head assemblies each respectively connected to one of the gimbals. In the double head flexure assembly the two head assemblies are positioned back to back with one of the head assemblies facing upward and the other head assembly facing downward. A single arm assembly is associated with the top surface of the first disk and has its read/write head assembly (commonly referred to as a head) mounted at the distal end thereof and facing downward. A single arm assembly is associated with the bottom surface of the last disk and has its read/write head assembly mounted at the distal end thereof and facing upward. A double arm assembly is positioned between each pair of disk surfaces and has one of its head assemblies facing upward for association with the bottom surface of the upper disk of the pair of disks and has its other head assembly facing downward for association with the top surface of the lower disk of the pair of disks. All of the heads are vertically aligned so that as the actuator rotates the arm assemblies move the heads in unison over the surface of the disks to position the heads over a selected disk track or surface for normal read/write operation.

A conventional read/write head assembly consists of a ferrite or permalloy core around which is wrapped a coil of wire. The core is a ring-shaped solid with a split or gap in it. The gap is filled with a non-magnetic material, usually glass or aluminum oxide, so that the magnetic leakage field is forced across it when dam is written. The coil is used to induce a magnetic field for writing data or to sense change in magnetic flux direction for reading data. The core is mounted upon a slider, usually a rectangular solid which is shaped to provide aerodynamic lift when the disk rotates. Typically, the end of the slider opposite the core has a beveled edge forming a ramp like surface which provides the initial aerodynamic lift as the disk rotates. One conventional head technology has a slider and core made from the same block of ferrite material and is known as monolithic head technology.

Another newer head technology known as thin film head technology is an adaptation of integrated circuit technology. Instead of a ferrite torrid with a bonded glass gap and wire coil, functionally equivalent elements are layered onto a desirable substrate using a photolithographic technique. Thin film heads are typically built in pairs, with one transducer on each rail of the slider. The end of the slider opposite the transducers is sloped generally by a bevel forming a ramp like edge to provide initial aerodynamic lift as the disk rotates. Both monolithic and thin film head technology are well known today.

The data heads regardless of type are attached to a suspension or gimbal which is connected to the load beam which is connected with a mounting plate to the arm member of the actuator. As is well known the gimbal allows the slider to pitch, roll and move vertically over a limited range but not to change angle with respect to the track or move forward, back or sideways. This gives the slider compliance with the media surface by permitting it to maintain a constant flying height over minor disk irregularities. The physical connection of the head to the gimbal, the gimbal to the load beam and the load beam to the arm member of the actuator are all well known.

In one head assembly arrangement, the head is attached to the gimbal and the rails of the head are substantially parallel to the axis of the arm assembly and the gap for the transducer is positioned at the farthest point from the pivot of the actuator. Such heads are aerodynamically designed to fly over the disk surface during clockwise rotation with the ramp end facing into the direction of rotation of the disk being slightly elevated away from the disk surface with respect to the down stream end. These heads have a landing zone at the disk outer diameter. This arrangement is referred to as having the heads flying forward. Since the gap is at the end of the arm at a point furthest away from the pivot, the required wiring for the transducer is simplified.

In another head assembly arrangement, the head is attached to the gimbal and the mils of the head are substantially parallel to the axis of the arm as described above, but the gap for the transducer is positioned at the point closest to the pivot of the actuator. These heads are also aerodynamically designed to fly over the disk surface during clockwise rotation but have a landing zone at the disk inner diameter. The ramp end of the head facing into the direction of rotation of the disk is slightly elevated away from the disk surface with respect to the down stream end. This arrangement is referred to as having the head flying backward. Since the gap is at the end of the arm at a point closest to the pivot the wiring of the transducer is more difficult. Both types of heads are well known, and have been used in commercially available disk drives. All known disk drives having a rotary actuator have the head assemblies vertically aligned and accordingly use one or the other of the above described head assemblies but do not mix the two types of head assemblies.

When there are two disks upon the spindle the actuator has two single arm assemblies and one double arm assembly. The first single arm assembly has a single downward facing head to fly over the upper surface of the first disk, the double arm assembly has a pair of heads, one head facing upward to fly over the lower surface of the first disk and a second head facing downward to fly over the upper surface of the second disk, and the second single arm assembly with a upward facing head to fly over the lower surface of the second disk. Each of the heads are vertically aligned and move in unison over the surface of the disks when the actuator pivots. Of course, if there are more than two disks the same arrangement applies with a double arm assembly having an upward and downward facing pair of heads positioned between each pair of disk surfaces. The upward and downward facing pair of heads are mounted substantially back to back so that the double arm assembly has two separate gimbals each holding one of the heads and two separate load beams each connected to the arm member with a mounting plate. Accordingly, the space between each pair of disks must be large enough to accommodate the pair of head assemblies each mounted to their respective gimbals and load beams and the arm member that holds them.

The trend in recent years has been to reduce the overall physical size, commonly referred to as form factor, of the disk drive. The spacing between disks mandated by the back to back mounted heads together with their gimbals, load beams and the arm member is recognized by those of ordinary skill in the field as a limiting factor in reducing the size of the disk drives. Efforts to reduce the space needed between disks has lead to the development of thinner sliders and low profile suspensions. Yet any attempt to reduce the space needed between disk surfaces must retain certain physical parameters or characteristics of the arm assembly. For example, the gimbal must be rigidly attached to the load beam but still must have high strength and compliance and both the load beam and arm member must have low mass for fast acceleration with low energy and must be structurally rigid to minimize vibrational resonances in the slider and gimbal. In spite of the recognized desirability of reducing the spacing between disks, all known rotary actuator arms positioned between disks have the head assemblies mounted back to back.

Even with all of these efforts the current arm member is approximately 0.030 inches thick, each head is approximately 0.030 inches thick and each gimbal and load beam is approximately the same. Accordingly, the minimum spacing between disks needed to accommodate the arm assembly with back to back heads remains at approximately 0.090 inches.

In known disk drives, during the manufacturing process, the actuator is independently assembled and mounted onto a baseplate while the disk/spindle assembly is mounted onto the same baseplate. A unitary baseplate is used for rigidity and strength. During the joining of the actuator and disk/spindle assembly, a comb type element is used to separate the arm assemblies of the actuator and lift the heads to the position the heads would have if they were flying over the disk surface. The actuator arm assemblies are then simply rotated to physically merge with the disk/spindle assembly and the comb is removed. The actuator arms are then rotated further to position the heads over their appropriate landing zones or areas.

In another known manufacturing technique referred to as air merge, neither the actuator nor the disk/spindle assembly is attached to the baseplate. The actuator arm assemblies are spaced apart with a comb and the disk/spindle assembly is positioned in a fixture facing the actuator. Now the actuator assembly and the disk/spindle assembly are moved relative to each other and the actuator is merged with the disk/spindle assembly and the comb is removed. The merging continues until the arms position the heads over the respective landing areas. The actuator and disk/spindle assembly are now mounted onto the baseplate. The air merge operation requires complex fixtures to hold the actuator and disk/spindle assembly in the proper position and within tolerances. This process becomes increasingly difficult with smaller form factor drives and is not even possible if the spindle is pre-mounted onto the baseplate as is commonly the case.

In still other known manufacturing processes, the baseplate has been split in numerous ways to facilitate the joining of the parts together. However, in these known split baseplate processes the actuator and disk/spindle assembly have always been mounted on the same portion of the split baseplate to provide stiffness and rigidity.

SUMMARY OF THE INVENTION

The present invention is a disk drive in which the spacing between adjacent disk surfaces is reduced thereby providing a compact disk drive unit, especially useful in the 1.8 inch form factor disk drives, though also applicable to larger drive configurations. In the preferred embodiment, the spindle has two disks that rotate clockwise and the actuator structure has, for the top surface of the first disk, a single arm assembly with the head facing downward onto the top surface of the first disk and flying forward with the landing zone at the disk outer diameter; for the between disk surfaces, two arm assemblies lie in substantially the same horizontal plane with the downstream arm positioned with the head facing upward and flying forward with the landing zone at the disk outside diameter, and the upstream arm positioned with the head facing downward and flying backward with the landing zone at the disk inner diameter; and, for the bottom surface of the second disk, a single arm assembly with the head facing upward and flying backwards with the landing zone at the disk inner diameter. Each of the arm assemblies between disk surfaces lie in substantially the same horizontal plane which is spaced apart from and parallel to the surfaces of the disks. Each of the arm assemblies between disk surfaces have a single arm member, one end of which is integral to the actuator body, a single load beam, gimbal and head assembly, accordingly, the spacing between the disk surfaces is reduced to accommodate only the thickness of a single arm member, a single load beam, gimbal and head assembly. The pair of arm assemblies between each pair of disk surfaces is referred to as a y-arm and as the actuator pivots, the respective heads move in opposite directions across the respective disk surfaces along an arc. Accordingly, contrary to all known rotary actuator disk drives, two different types of arm assemblies are used, the first with a landing area at the outer diameter of its associated disk and the second with a landing area at the inner diameter of its associated disk. Each type of arm assembly has its read/write head assembly aligned along a separate but parallel axis which is substantially perpendicular to the disk surface.

The disk drive with the y-arm actuator cannot be assembled according to the known actuator rotation methods since the rotation of the arm assemblies between disk surfaces would collide with the spindle. Accordingly, the baseplate is split or separated into two pars with the disk/spindle assembly mounted to one part of the baseplate and the actuator mounted to the other part of the baseplate. A comb is inserted into the actuator to position the heads at simulated flying height and the two pans of the baseplate are merged together and the comb is removed. The merger continues allowing the actuator arm assemblies between two disks to straddle the spindle as the heads are positioned at their respective landing zones. The two pans of the baseplate are then joined together to provide a rigid baseplate.

BRIEF DESCRIPTION OF THE DRAWINGS

Other advantages of the invention will become apparent upon reading the following detailed description and upon reference to the accompanying drawings, in which.

While the invention is susceptible to various modifications and alternative forms, specific embodiments thereof have been shown by way of example in the drawings and will be described in detail herein. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE INVENTION

Figure 1:
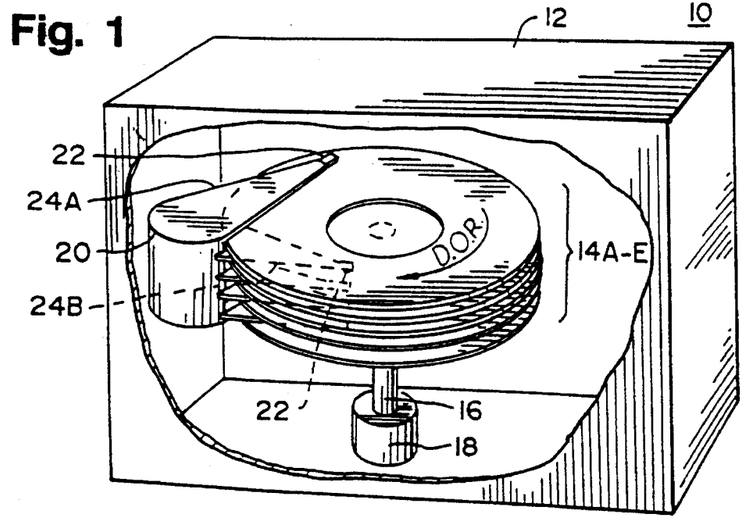
FIG. 1 is a perspective view of a disk drive according to the present invention and having a plurality of disks.
Figure 3:
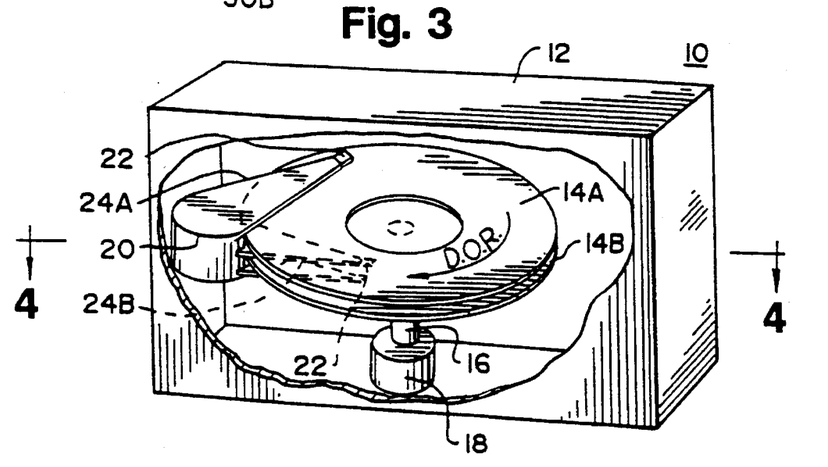
FIG. 3 is a perspective view of the preferred embodiment of a two disk drive according to the present invention.

FIG. 1 is a perspective view of a disk drive 10. Many portions of the disk drive have been deleted from FIG. 1 for the sake of clarity and other parts are shown in diagrammatic form to better illustrate the invention. The housing 12 for the disk drive 10 is shown in partial cut away. A plurality of disks 14A through E are mounted upon a spindle or shaft 16. While five disks are illustrated, the present invention is intended to be used with any number of disks from two upward. In particular, the present invention is well suited to a two disk system which is useful in the new 1.8 inch form factor disk drives and is shown in FIG. 3 and described hereinafter. A motor 18 is connected to the spindle 16 and rotates it at a desired speed in the clockwise direction (D.O.R.) shown by the arrow. An actuator 20 is positioned adjacent to the disks 14A through E. A read/write head assembly 22 (hereinafter sometimes referred to simply as a head) is part of each of a plurality of arm assemblies 24 of the actuator 20. The heads 22 are moved back and forth over the surface of the disks 14A through E under the control of the actuator 20. As is well known to those of ordinary skill in the field, the actuator 20 positions the heads 22 over specific dam tracks or cylinders for read/write operations. The motor 18 drives the spindle 16 causing the disks 14A through E to rotate at high speed in the clockwise direction. The air currents generated by the rotating disks 14A through E cause the heads 22 to fly on a cushion of compressed air over the surface of the disks 14A through E. There are two types of arm assemblies connected to the actuator 20. The first or A type of arm assembly 24A is shown on the top surface of disk 14A. This arm assembly 24A has the head 22 flying forward and the landing area at the disk outside diameter. The second or B type of arm assembly 24B is partially seen in dashed lines between disk 14A and 14B and again partially seen between disks 14B and 14C and 14C and 14D and 14D and 14E. This second type of arm assembly 24B has the head 22 flying backward and the landing area at the disk inside diameter. Thus, between each pair of disks 14A–14B, 14B–14C, 14C–14D, 14D–14E is one arm assembly of the first or A type and one arm assembly of the second or B type. Finally, for the bottom surface of the last disk 14E is another arm assembly of the first or A type which is not visible in FIG. 1.

In the preferred embodiment the A type of arm assembly on the top surface of disk 14A has its head facing downward; between disks 14A and 14B, the A type of arm assembly has its head facing upward and the B type of arm assembly has its head facing downward; between disks 14B and 14C, the A type of arm assembly has its head facing downward and the B type of arm assembly has its head facing upward; between disks 14C and 14D, the A type of arm assembly has its head facing upward and the B type of arm assembly has its head facing downward; between disks 14D and 14E, the A type of arm assembly has its head facing downward and the B type of arm assembly has its head facing upward; finally the A type of arm assembly on the bottom surface of disk 14E has its head facing upward. Accordingly, there are six type A arm assemblies and four type B arm assemblies. It will be appreciated by one of ordinary skill that the above sequence could begin with a type B arm with its head facing downward and the remainder of the sequencing would change accordingly.

Figure 2A:
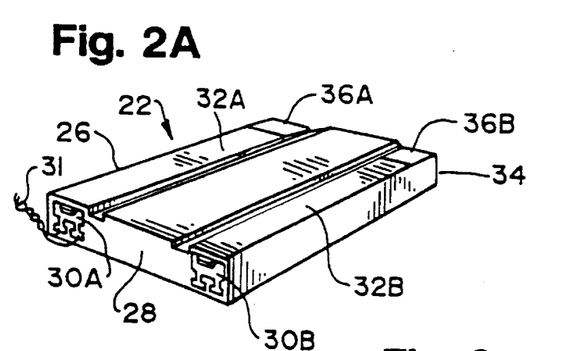
FIG. 2A and 2B are illustrations of a typical thin-film head assembly for use with the present invention.

FIG. 2A is a perspective view of a typical thin film head assembly 22 facing upward as used in the preferred embodiment. However, it will be understood by those of ordinary skill in the art that other thin film head designs and other head technology can be used without departing from the scope of the invention. A slider or substrate 26 has a front surface 28 on which is diagrammatically shown a pair of read/write transducers 30A and 30B as is well known in the art. Transducer 30A has representative lead wires 31 which would be connected as is well known in the art. Since only one head is used in the read/write operation, transducer 30B for the sake of clarity is shown without similar lead wires. Either transducer 30A or 30B could be used for read/write operations depending upon where the head is used as will be fully explained hereinafter. Each transducer 30A and 30B is respectively positioned upon a rail 32A and 32B of the slider 26. The opposite end 34 of the slider 26 has a bevel cut along a portion of its edge to form aerodynamic ramps 36A and 36B which provide initial lift when the disks are rotated. It will be understood by those of ordinary skill in the art that any other suitable designs for aerodynamic lift can be used without departing from the scope of the invention.

Figure 2B:
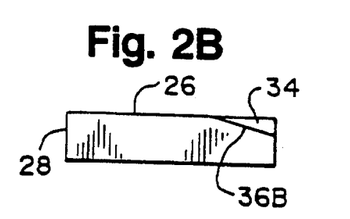

FIG. 2B is a right side view of the head assembly 22 of FIG. 1. In FIG. 2 the bevel cut of the end 34 is clearly illustrated forming the aerodynamic ramps 36A and 36B.

FIG. 3 is a general representation of a 1.8" form factor disk drive 10 according to the preferred embodiment of the present invention having two disks 14A and 14B. The actuator 20 has four arm assemblies, two arm assemblies 24A are of the type A described above as flying forward and having a landing zone at the disk outside diameter. These type A arm assemblies 24A each have a head 22 at its distal end. The head 22, part of the first type A arm assembly 24A, flies over the top surface of the first disk 14A and the second type A arm assembly, not shown, flies over the bottom surface of the first disk 14A. In addition, two type B arm assemblies 24B are connected to the actuator 20. The first type B arm assembly 24B, shown in partial dotted lines, is mounted in the same plane as the second type A arm assembly and has a head flying backwards and has a landing zone at the disk inner diameter. The head 22, pan of the first type B arm assembly 24B, flies over the top surface of the second disk 14B. The second type B arm assembly, partially shown, has a head that flies backward and has a landing zone at the disk inner diameter and flies over the bottom surface of the second disk 14B.

Figure 4:
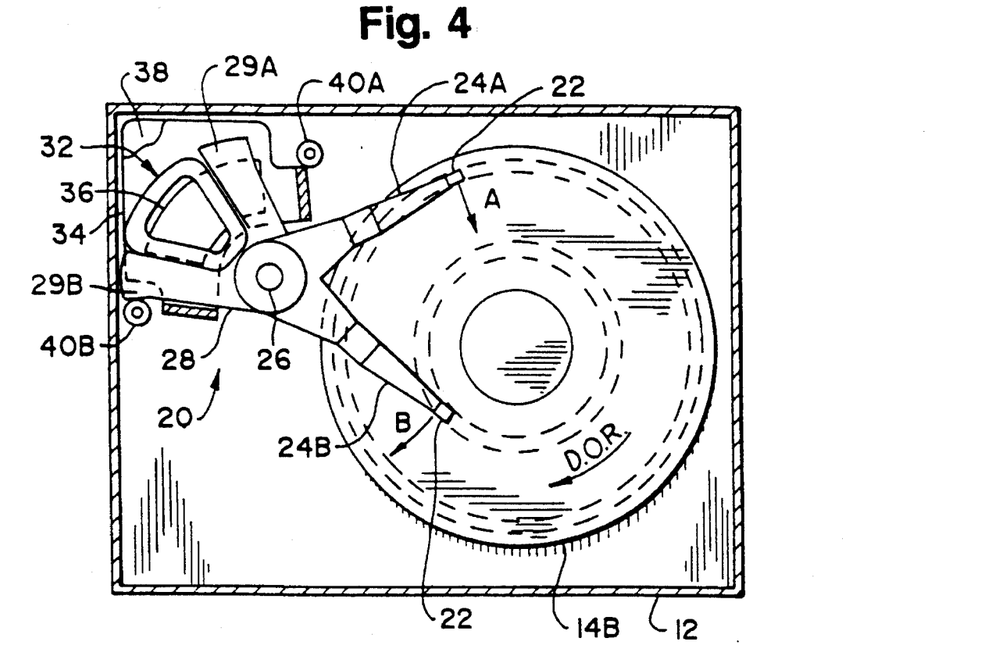
FIG. 4 is a top view of a cross section along line 4—4 of FIG. 3 showing the Y-arm actuator of the present invention between disks with the head assemblies at their respective landing zones.

FIG. 4 is a top view of the cross section of the disk drive 10 of FIG. 3 along lines 4—4. The disk 14B in FIG. 4 is the second disk in the stack and the direction of rotation is clockwise as indicated by the arrow. The actuator 20 is shown in slightly more detail but it should be understood that any known actuator can be used without departing from the scope of the invention. Each arm assembly 24A and 24B is connected to a pivot 26 and rotates about the pivot 26 to move the respective heads 22 in an arc over the bottom surface of the disk 14A (not shown) and the top surface of disk 14B. Arm assembly 24A moves its head 22 through an arc generally represented by the arrow A. Arm assembly 24B moves its head 22 through an arc generally represented by the arrow B. A coil holder 28 has two arms 29A and 29B forming a general "V" shape. The coil holder 28 is connected for rotation about pivot 26. The arm assemblies 24A and 24B together with the coil holder 28 form a rigid member and rotate in unison. Of course, the other arm assemblies of the actuator 20, not shown, also move in unison. A coil 32 is connected between the arms 29A and 29B of the coil holder 28. A base plate or bottom pole 34 is mounted to the bottom of the housing 12. A permanent magnet 36 is fixedly mounted to the base 34 and is positioned below the coil 32. A plate or top pole 38 having the same general shape as the base 34 is placed over the above elements and is shown partially cut away for the sake of clarity. As is well known, passing a current through coil 32 creates a force proportional to the current which causes rotation about the axis of pivot 26. Of course, the arm assemblies 24A and 24B carrying their respective heads 22, and coil holder 28 and coil 32 rotate in unison while the base 34, plate 38 and permanent magnet 36 remain fixed. The coil holder 28 moves between the crashstops 40A and 40B in response to the force created by the current passing through coil 32 as is well known to one of ordinary skill in the field.

In FIG. 4, arm assembly 24a has an upward facing head 22 to read/write to the bottom surface of the first disk 14A, shown in FIG. 3. The aerodynamic ramps 36A and 36B, shown in FIGS. 2A and 2B are closest to the pivot 26, the landing zone is at the outside diameter of the disk 14A. The head 22 is considered as flying forward and the transducer 30A on the inside rail 32A is used for the read/write operation. The arm assembly 24B is in substantially the same horizontal plane as arm assembly 24A but positioned upstream. The arm assembly 24B has a downward facing head 22 to read/write to the top surface of the disk 14B, the aerodynamic ramps 36A and 36B are farthest from the pivot 26 and the landing zone is at the disk 14B inside diameter. The head 22 is considered to be flying backwards and the transducer 30A on the outside rail 32A is used for the read/write operation. A current is applied to the coil 32, the actuator 20 rotates about pivot 26 and the arm assemblies 24A and 24B move in opposite arcs over the bottom surface of disk 14A and the top surface of disk 14B respectively, as described above.

Figure 5:
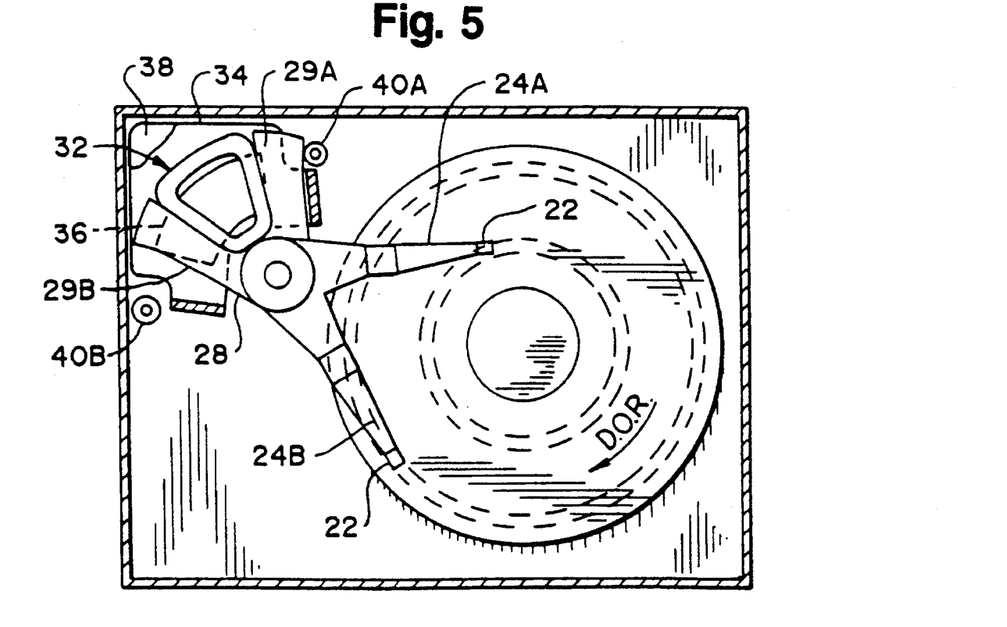
FIG. 5 is a top view of the Y-arm actuator of FIG. 4 with the head assemblies moved to the opposite extreme position.

FIG. 5 illustrates the arm assemblies 24A and 24B rotated to the opposite extreme compared to FIG. 4. It will be obvious that the type A arm assembly on the top surface for disk 14A and the type B arm assembly on the bottom surface of disk 14B also rotate in unison with the motion described above. Furthermore, as one of ordinary skill in the art knows, the variation in current supplied to coil 32 can cause the respective arms to stop over any desired track of the disks for normal read/write operations.

Since the transducer 30A on the inside rail 32A of the head 22 of arm assembly 24A is at a point farthest from the pivot 26 and the transducer 30A on the outside rail 32A of the head 22 of arm assembly 24B is at a point closest to the pivot 26, these transducers do not move the same distance across the respective disk surface for the same angular movement of the actuator 20. This causes the track pitch on one head to be correct for its transducer width but incorrect for the other head. This problem is solved in the preferred embodiment by using two different angles to represent the track spacing. This approach defines the track spacing at the disk surface rather than the angular motion the actuator 20 travels. Each head 22 moves the same amount with respect to the disk surface. The angle the actuator 20 rotates to accomplish this is different for each type of arm assembly 24A and 24B. Accordingly, the same head is used for both types of arm assemblies 24A and 24B and the track density for both heads are maximized. However, the tracks for each type of an assembly are written at different times causing the writing time to be longer and the servo must use two different seek profiles in order to move the heads over the disks, as will be understood by one of ordinary skill in the art.

Another solution to this problem is to define a track pitch by a given angle of rotation of the actuator 20. The transducer of each head would then be designed to match the corresponding track pitch that is produced by that angular motion as will be understood by one of ordinary skill in the art. In this approach, all the heads appear the same to the servo used to move the heads across the disks. In addition, all the servo information may be written for all heads at the same time. However, the track density is not maximized for both types of arm assemblies, resulting in a loss of capacity for the drive. Finally, the two different arm assemblies need two different heads which result in more complexity and cost.

Figure 6A:
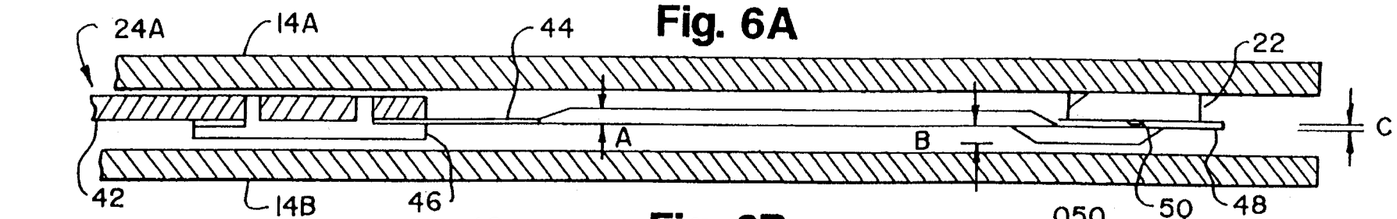
FIGS. 6A and 6B are an illustration of the two types of single arm assemblies positioned between disk surfaces according to the present invention.

FIG. 6A illustrates an arm assembly 24A positioned between disk 14A and 14B. As described above, there is another arm assembly 24B in substantially the same horizontal plane which is not illustrated for the sake of clarity. The arm 24A comprises the arm member 42 which is integrally connected at one end to the actuator 20, not shown. The arm assembly 24A is positioned to read/write data onto or from the bottom surface of the disk 14A. A load beam 44 is connected to the arm member 42 by swaging the mounting plate 46 through an appropriate aperture in the arm member 42 and load beam 44 as is well known in the art. Of course, any other suitable means of connecting the arm member 42 and the load beam 44 can be used. The gimbal 48 is attached to the load beam 44 in any well known manner. The gimbal 48 is folded or bent back upon itself and spaced by the dimple 50 as is well known in the field. The head is mounted to the gimbal in any well known manner. The arm assembly 24A has the transducer 30A at a point farthest away from the pivot 26 and the aerodynamic ramp 36A at a point closest to the pivot 26. In the preferred embodiment, the distance between disk surfaces 14A and 14B is approximately 0.050 inches. The arm member 42 has a thickness of approximately 0.022 inches. The distance from the bottom surface of the top disk 14A to the bottom of the mounting plate 46 is approximately 0.043 inches. The distance between the bottom of the top disk 14A and the arm member 42 is approximately 0.007 inches. The distance between the bottom of the mounting plate 46 and the top surface of disk 14B is approximately 0.007 inches. The rail height A of the load beam 44 is approximately 0.014 inches. The load beam relief depth B is approximately 0.011 inches. The offset C is approximately 0.004 inches. The head thickness is approximately 0.022 inches.

Figure 6B:
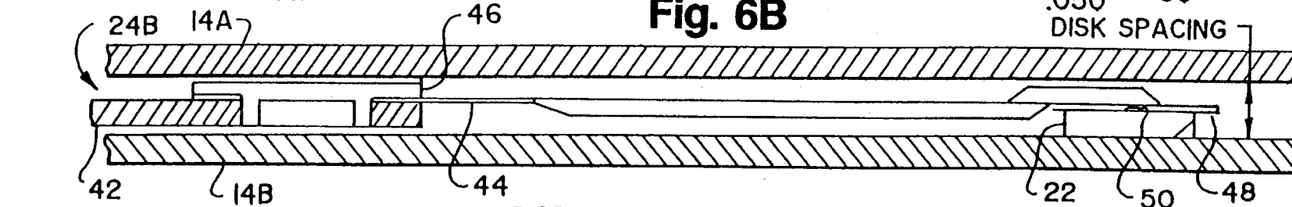

FIG. 6B illustrates an arm assembly 24B positioned in substantially the same horizontal plane as arm assembly 24A between the disks 14A and 14B. The arm assembly 24A is not shown in FIG. 6B for sake of clarity. The arm assembly 24B is positioned to read/write data onto or from the top surface of disk 14B. The same reference numbers in FIG. 6A refer to the same parts in FIG. 6B. The same relative distances described in FIG. 6A also apply to FIG. 6B Since the arms are substantially in reverse symmetry from one another, the overall distance between the disk surfaces 14A and 14B is significantly reduced to approximately 60% of that needed in known disk drives.

Figure 7:
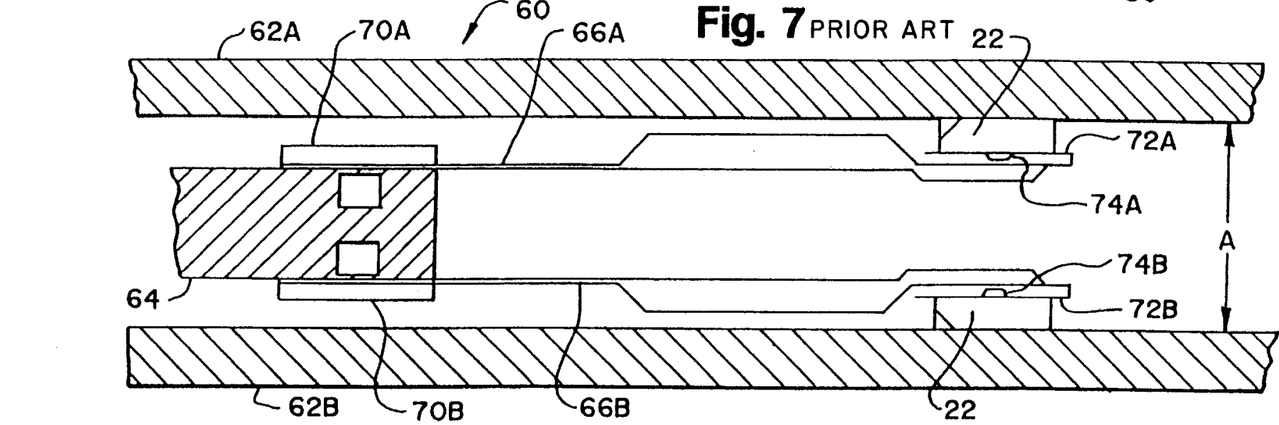
FIG. 7 is an illustration of the known double arm assembly with back to back head assemblies

FIG. 7 illustrates a common configuration for a double arm assembly 60 between two disk surfaces 62A and 62B. The two disks 62A and 62B are separated by a distance A approximately 0.090 inches which is needed to accommodate the arm assembly with the standard back to back head alignment. A single arm member 64 is connected to the actuator (not shown). A first load beam 66A is attached to arm member 64 by swaging mounting plate 70A as is well known. A gimbal 72A is attached to the load beam 66A in any well known manner. The gimbal 72A is folded or bent back upon itself and separated by a dimple 74A. A head assembly 22 is connected to the gimbal 72A and is positioned to read/write data from and to the bottom surface of disk 62A. A second load beam 66B is also attached to the arm member 64 by swaging mounting plate 70B. A second gimbal 72B is attached to the second load beam 66B. The gimbal 72B is folded back or bent back upon itself and separated by a dimple 74B. A head assembly 22 is connected to the gimbal 72B and is positioned to read/write data from and to the top surface of disk 62B. Thus, the overall distance A between the disks 62A and 62B has to accommodate the above described dual structure.

The most significant aspect of the present invention is the substantially same horizontal plane alignment of the pair of arm assemblies each carrying a single head and being positioned between two disk surfaces. However, it will be appreciated by one of ordinary skill in the art that the reference to two arm assemblies is intended to describe the present invention accordingly to conventional terminology. In this regard, it is the operation of the head assemblies between the two disks, one positioned with a landing zone at the outer diameter of one disk and the other positioned with a landing zone at the inner diameter of the other disk that result in the invention. Accordingly, it is within the scope of the present invention that the pair of arm assemblies could be replaced with a singular arm structure which supports the two different head assemblies oriented as described. This invention allows the distance between disk surfaces to be reduced in comparison to the known single arm back to back head arrangement. This invention enables the overall size of the disk drive to be reduced without reducing capacity or, if the overall size of the disk drive is held constant, the number of disks and accordingly the storage capacity of the disk drive can be increased. In the 1.8" form factor disk drives, the present invention allows two disks to be used as opposed to the previous known single disk, thereby doubling the storage capacity of the disk drive. It should also be appreciated by one of ordinary skill in the field that in the preferred embodiment the specific orientation of the arms and heads, the landing zones and the disk rotation has been described, but that any other configuration of arms and heads, landing zones and rotation of the disks can be used without departing from this invention.

The present invention cannot be manufactured using known techniques. Since the pair of arm assemblies between the disk surfaces are aligned in substantially the same horizontal plane but on different sides of the spindle, the actuator cannot be merged by rotation with the disk/spindle assembly. While an air merge as described above would be technically feasible, the smaller form factors disk drives where the present invention is particularly useful are difficult to assemble using this technique. Furthermore, as a practical matter, most spindles are purchased already secured to the baseplate making the air merge technique unusable. In order to overcome these problems associated with the disk drive of the present invention, it is assembled using a split baseplate technique with the actuator secured to one portion of the baseplate and the spindle/disk assembly secured to the other portion of the baseplate.

Figure 8:
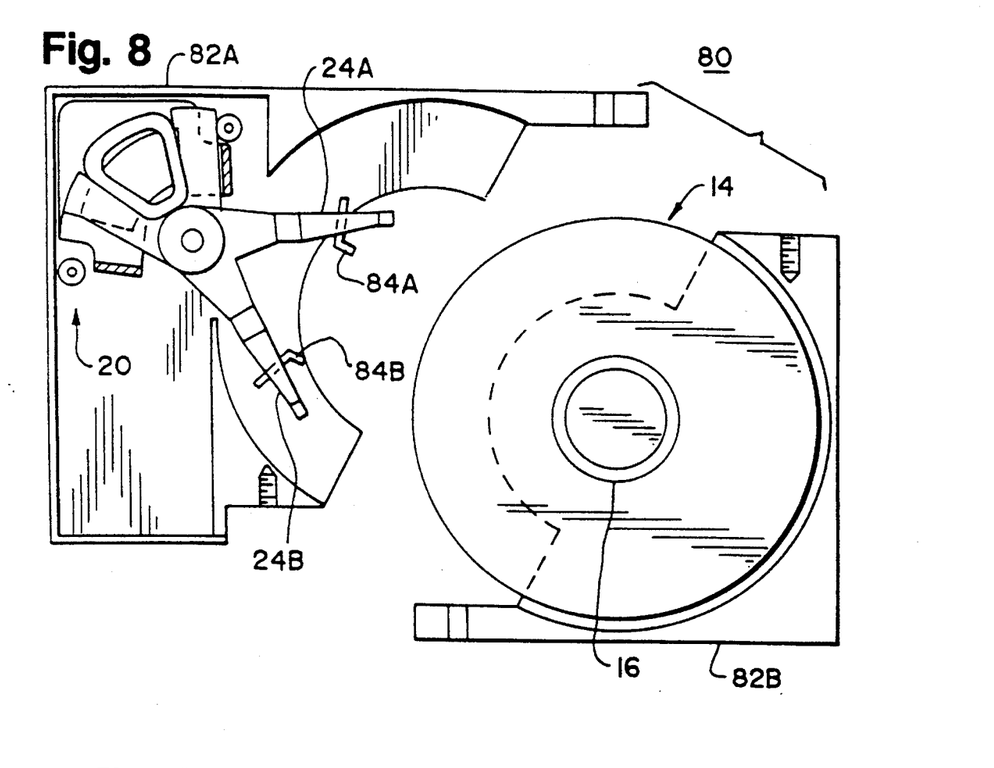
FIG. 8 is a top view of the split baseplate disk drive of the present invention before merger.

FIG. 8 illustrates a top view of the split baseplate assembly 80 before assembly or merger. A first portion of the baseplate 82A has the actuator 20 secured thereto by any conventional means. The actuator 20 has all of the arm assemblies connected and positioned in simulated flying position by combs 84A and 84B as is well known in the art. The type A arm assembly 24A for placement over the top surface of the first disk 14A and the type B arm assembly 24B for placement over the top surface of the second disk 14B are shown in FIG. 8. It will be apparent that the other arm assemblies discussed above are aligned below the two visible arm assemblies 24A and 24B. The other portion of the baseplate 82B has the disk/spindle assembly secured to it in any well known manner.

The two portions of the baseplate 82A and 82B are now physically brought together or merged using a fixture assembly for holding the two portions as is well within the ability of someone ordinarily skilled in this field. Once the arm assemblies 24A and 24B are positioned over the appropriate disk surfaces the combs 84A and 84B are removed. The merging continues until the two portions 82A and 82B of the baseplate meet. Since the baseplate 82 is separated, the actuator 20 is fully assembled and tested independent of the disk/spindle assembly, which is also fully assembled and tested. This independent assembly provides the opportunity to determine defects before final assembly. Of course, if a defect in either portion of the baseplate assembly 80 is detected another portion, either 82A or 82B, can be substituted without waiting for repair or re-working of the defective portion.

Figure 9:
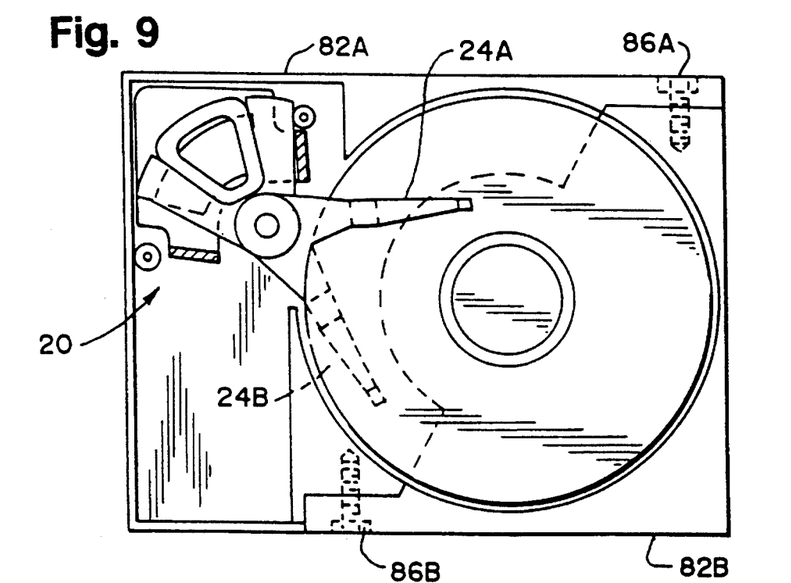
FIG. 9 is a top view of the merged split baseplate disk drive of the present invention.

FIG. 9 illustrates the assembled unit with the two portions 82A and 82B being secured together with pins 86A and 86B. It will be obvious that any other suitable securing means can be used.

A disk drive with reduced spacing between disk surfaces has been described. The reduced spacing between disk surfaces is achieved by having a pair of arm assemblies each with a single head assembly positioned or aligned in substantially the same horizontal plane between disk surfaces. A preferred embodiment of the arm assembly including head orientation, the landing zones, and the disk rotation has been described. However, it is well within the ability of one of ordinary skill in the field to rearrange these parameters into any suitable configuration or permutation without departing from the present invention. While particularly useful for the smaller form factor disk drives, the present invention can be used with any number and size of disks. Finally, the preferred method of manufacturing or assembling the present invention utilizing a split baseplate with the preassembled actuator secured to one portion and the preassembled spindle/disk assembly secured to the other portion has been described.

What is claimed is:

1. A process of assembling a disk drive having an actuator with a plurality of arm assemblies, each having at least one read/write head at its distal end, mounted on one portion of a base plate and a spindle/disk assembly having a plurality of disks mounted on a separate second portion of said baseplate comprising:

separating said arm assemblies of said actuator with at least one comb;

merging said arm assemblies of said actuator with said spindle/disk assembly until said arm assemblies are positioned over a portion of said spindle/disk assembly;

stopping said merging and removing said at least one comb;

merging said baseplate portion having said actuator with said baseplate portion having said spindle/disk assembly until both portions of said baseplate meet; and fastening said portions of said baseplate together to form a rigid disk drive.

2. The process of claim 1 wherein said at least one comb lifts said read/write heads to at least a simulated flying height.

3. The process of claim 1 wherein said merging of said arm assemblies with said spindle/disk assembly comprises the further step of rotating said arm assemblies to position said read/write heads over respective landing zones on said disks.

* * * * *